Patented Aug. 4, 1931

1,817,425

UNITED STATES PATENT OFFICE

GERHARD STEIMMIG AND HEINRICH ULRICH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF ESTERS

No Drawing. Application filed February 3, 1927, Serial No. 165,751, and in Germany January 29, 1926.

It is known that alkylene oxids readily react with inorganic acids to form unitary products, for example ethylene oxid furnishing ethylene-chlorhydrin with hydrochloric acid. On the other hand, in the case of organic acids, if any reaction occurs at all, it only results in heterogeneous products, in small yields.

We have now found that aliphatic alkylene oxids, including their aliphatic substitution products, free from halogen, may be converted in a simple manner, into esters of glycol or its homologues or derivatives with organic acids, if the alkylene oxids, or their substitution products, be treated with organic acids, or their anhydrides or substitution products all of which are equivalents for the purpose of the present invention, at an elevated temperature and in the presence of catalysts. The catalysts suitable for this reaction may be of most varied kinds. Especially such catalysts are suitable as are capable of forming reactive complex compounds with the organic acid, which compounds are of stronger acidity than the free acid. As examples, thereof, acid salts of mineral acids, salts of organic acids with strong bases, and the like may be mentioned. By the term "elevated temperature" we wish to define temperatures between 55° and 170° C., the temperature of working depending to some degree on the acidity of the acids to be esterfied and being usually somewhat above 100° C.

Depending on the catalyst employed and the other conditions of working, such as the proportions of the alkylene oxid and the organic acid or acid anhydride, the alkylene oxids are converted into mono- or di-esters of glycols or mixtures of both. Even with a large excess of the organic acid, mono-esters can be obtained as will be more fully shown hereinafter in the examples. Generally the reaction proceeds in a practically quantitative manner.

The process according to the present invention may be carried out for example by adding to an organic carboxylic acid a small amount of a strong mineral acid e. g. sulfuric acid, or an acid reacting salt of such an acid e. g. sodium bisulfate, heating and stirring the mixture and passing the vapors of ethylene oxid or of one of its homologues into the liquid. Neutral salts such as alkali metal salts of the carboxylic acids, may also serve as catalysts. If instead of one carboxylic acid mixtures of several such acids are employed, a certain amount of mixed esters is also obtained i. e. esters in which different radicals are attached to the hydroxyl groups of the glycol body.

The following examples will further illustrate how the said invention may be carried into practical effect but the invention is not limited to these examples. The parts are by weight.

Example 1

Equimolecular quantities of acetic acid and ethylene oxid are heated to a temperature of about 120° C. with the addition of 3 per cent of sodium acetate. Glycolmonoacetate is produced, the yield being about 95 per cent of the theoretical.

Example 2

To a boiling solution of 1½ molecular proportions of glacial acetic acid and about 5 per cent of an alkali metal acetate there is added, under a reflux condenser, 1 molecular proportion of an alkylene oxid. The monoacetic ester of the glycol corresponding to the alkylene oxid is obtained, in nearly quantitative yield.

Example 3

264 parts of ethylene oxid are introduced into a boiling solution of 10 parts of concentrated sulfuric acid in 360 parts of acetic anhydride under a reflux condenser. A good yield of glycoldiacetate is obtained.

Example 4

167.5 parts of ethylene oxid are introduced in a rapid stream while stirring actively into a mixture of 452 parts of glacial acetic acid and 8 parts of concentrated sulfuric acid boiling under a reflux condenser. The reaction proceeds rapidly and a good yield of glycol monoacetate is obtained, accompanied by small quantities of diacetate and esters of higher boiling point. The operation may also be conducted under pressure.

*Example 5*

In an acid-proof vessel with agitator and reflux condenser 500 kgs. of acetic acid in which 10 kgs. of sodium bisulfate are suspended, are heated to 120° C. and the vapors of 150 kgs. of propylene oxid introduced. By further treating the reacting mixture in the same manner as set forth in the foregoing example, 350 kgs. of propylene glycol diacetate (b. p. 186°, density 1.109) are obtained.

*Example 6*

122 kgs. of fused benzoic acid heated to 130°, are mixed with 5 kgs. of sodium benzoate and the vapors of 25 kgs. of ethylene oxid passed in, while stirring, temperature being raised slowly to 170° C. In order to remove unchanged benzoic acid, the reaction mixture still warm is extracted with a dilute warm solution of sodium carbonate and after cooling and freezing the aqueous solution and oily portions are filtered off. Glycoldibenzoate is left on the filter and obtained in pure form (m. p. 73–74°) by crystallization from methanol.

We claim:

1. The process of producing esters of glycols with organic acids which comprises acting on an organic acid with an aliphatic alkylene oxid at an elevated temperature and in the presence of a catalyst selected from the class consisting of acid salts of mineral acids and salts of organic acids with strong bases, which, under the conditions of working, form a reactive complex compound with said first named organic acid which is of a stronger acidity than said organic acid.

2. The process of producing esters of ethylene glycol with organic acids which comprises acting on an organic acid with ethylene oxid at an elevated temperature and in the presence of a catalyst selected from the class consisting of acid salts of mineral acids and salts of organic acids with strong bases, which, under the conditions of working, form a reactive complex compound with said first named organic acid which is of a stronger acidity than said organic acid.

3. The process of producing mono esters of glycols with organic acids which comprises acting on an organic acid with an alkylene oxid at an "elevated temperature" and in the presence of alkali metal acetate.

4. The process of producing ethylene glycol mono-acetate which comprises acting on acetic acid with ethylene oxid at an elevated temperature in the presence of alkali-metal acetate.

5. The process of producing ethylene glycol mono-acetate which comprises acting on acetic acid with ethylene oxide at a temperature of about 120° C. in the presence of sodium acetate.

6. The process of producing mono esters of glycols with organic acids which comprises acting on an organic acid with an alkylene oxide at an elevated temperature and in the presence of sodium bisulfate.

7. The process of producing propylene glycol diacetate which comprises acting on acetic acid with propylene oxide at a temperature of about 120° C. in the presence of sodium bisulfate.

8. The process of producing glycol benzoate which comprises treating fused benzoic acid with ethylene oxide at a temperature of about 170° C. in the presence of sodium benzoate.

In testimony whereof we have hereunto set our hands:

GERHARD STEIMMIG.
HEINRICH ULRICH.